United States Patent [19]

Clark

[11] 4,109,809
[45] Aug. 29, 1978

[54] MULTIPLE POSITION VEHICLE CARRYING TRAILER

[75] Inventor: Bobby Dean Clark, Shoshoni, Wyo.

[73] Assignee: Chair-E-Yacht, Inc., Shoshoni, Wyo.

[21] Appl. No.: 753,668

[22] Filed: Dec. 23, 1976

[51] Int. Cl.² .............................................. B60P 1/28
[52] U.S. Cl. .................................... 214/505; 296/1 A
[58] Field of Search ......................... 214/85, 505, 506; 296/1 A

[56] References Cited

U.S. PATENT DOCUMENTS 3,720,336   3/1973   Murray et al. ..................... 214/505

FOREIGN PATENT DOCUMENTS 971,515   7/1975   Canada .................................... 214/505

Primary Examiner—Robert G. Sheridan
Attorney, Agent, or Firm—Bernard L. Kleinke

[57] ABSTRACT

A trailer adapted to carry a plurality of vehicles includes a plurality of wheels rotatably mounted on a frame to support it rollably above the ground, and a pair of vehicle-supporting trailer beds normally disposed in a use position in side-by-side relationship in a common horizontal plane on the frame for each supporting individually from below one of the vehicles to be carried. Each one of the vehicle beds is hingedly mounted to the frame at a position forwardly of the mid-point of the beds to enable them to tilt individually and independently backwardly until the rear edges thereof contact the ground so that the vehicles to be carried can be driven up onto the beds to enable the thus loaded beds to tilt back to their use position under the weight of the vehicles. Latches are provided for holding the beds releasably in their use position. A turntable is mounted on the frame forwardly of the beds to enable the turntable to rotate about a centrally-disposed vertical axis independently of the beds, the turntable having a platform thereon for supporting at least another one of the vehicles to enable it to be driven from the turntable on to either one or both of the beds. A latching and detent device holds the turntable in a given position.

8 Claims, 4 Drawing Figures

U.S. Patent  Aug. 29, 1978  4,109,809
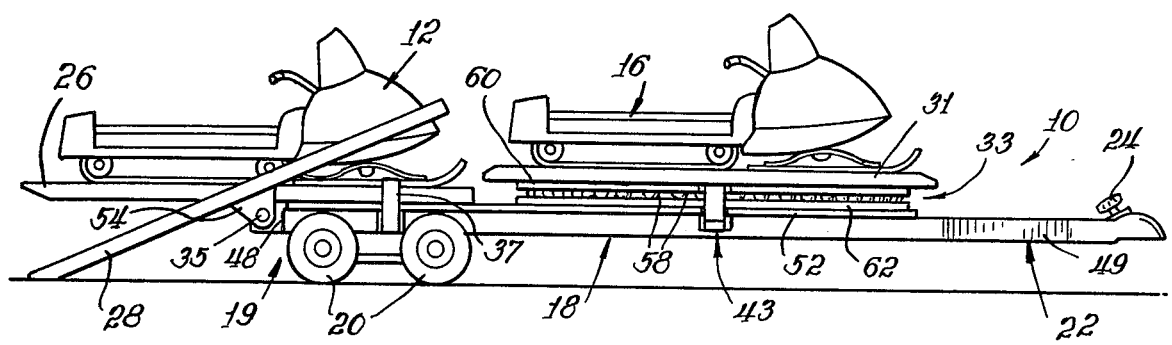
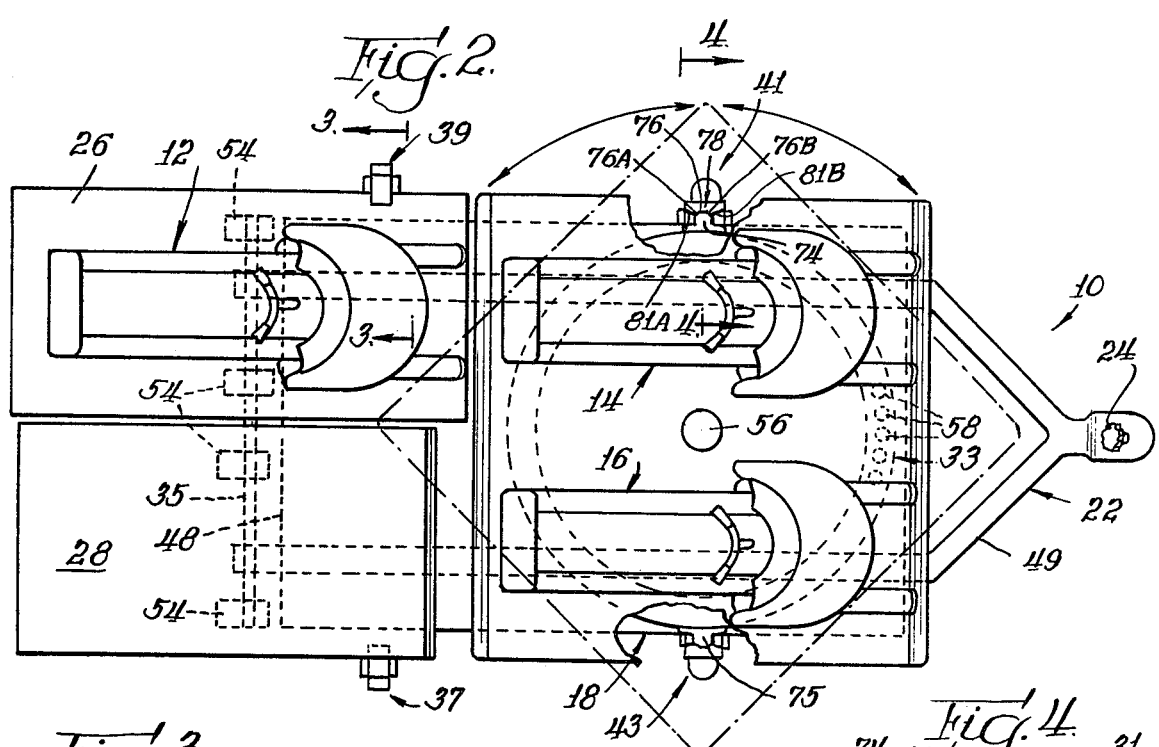
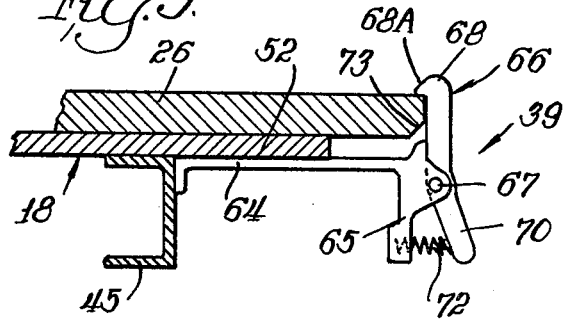
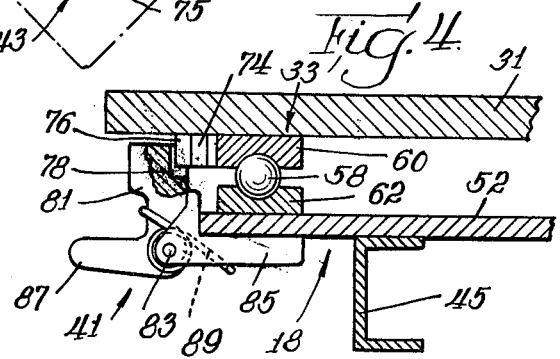

MULTIPLE POSITION VEHICLE CARRYING TRAILER

The present invention relates in general to a multiple position vehicle carrying trailer, and it more particularly relates to a trailer which is adapted to carry a plurality of vehicles and which facilitates the loading and unloading thereof.

There have been many different types and kinds of vehicle trailers for transporting vehicles, such as snowmobiles or other such small vehicles. For example, reference may be made to the following United States patents: U.S. Pat. Nos. 3,516,560; 3,536,214; 3,604,579; 3,613,914 and 3,690,481. When such a trailer is used for carrying snowmobiles having tracks, there is the problem of loading and unloading the snowmobiles from the trailer. In this regard, the tracks on the vehicle create a great deal of friction between the snowmobile and the trailer bed so that it becomes a very difficult task to push the heavy vehicle up onto the trailer and then for unloading purposes, pull the heavy snowmobile off of the trailer. Therefore, as can be seen from U.S. Pat. No. 3,604,579, a two-position trailer has been devised which includes a tilting ramp bed mounted on a turntable. Thus, the bed can be tilted backwardly until the rear edge thereof contacts the ground to enable the snowmobiles to be driven up onto the bed. For the purpose of unloading the trailer, the turntable is rotated through 180° to permit the snowmobiles to be driven off of the tiltable bed. However, when two snowmobiles are to be transported by such a trailer, they must be driven one at a time up onto the downwardly tilted bed which is pivotally mounted at the central portion of its underside to the trailer frame. Once one of the snowmobiles is driven up onto the inclined bed, it tends to slide backwardly out of position while the second snowmobile is driven up onto the inclined bed. Thus, it becomes very difficult for the user to tilt the bed back to its horizontal use position, since both of the snowmobiles must be properly positioned on the bed to have the heavy front end portions of the snowmobiles forwardly of the pivotal connection between the bed and the trailer frame to cause the weight of the snowmobiles to pivot back to the horizontal position for the bed. Hence, the user must go through many awkard and difficult manipulations to position properly the snowmobiles on th tilted bed to cause the bed to fall back to its horizontal position. Thus, it would be highly desirable to have a trailer which is adapted to carry a plurality of vehicles, such as snowmobiles, by enabling the user to conveniently load and unload the vehicles onto and off of the trailer. Such a trailer should be relatively inexpensive to manufacture and be efficient to use.

Therefore, the principal object of the present invention is to provide a new and improved multiple position vehicle carrying trailer, which can be loaded and unloaded in a convenient manner.

Another object of the present invention is to provide such a new and improved trailer, which is relatively inexpensive to manufacture and which can be used for carrying as many as four different vehicles simultaneously.

Briefly, the above and further objects of the present invention are realized by providing a pair of vehicle supporting trailer beds normally disposed in a use position in side-by-side relationship in a common horizontal plane on a frame rollably supported above the ground, each one of the beds adapted to support individually from below one of the vehicles to be carried. The trailer beds are each mounted pivotally to the trailer frame individually and tiltably at a position forwardly of the mid-point of the beds to enable them for loading and unloading purposes to tilt individually and independently backwardly until their rear edges contact the ground and to enable the loaded beds to tilt back to their horizontal use position under the weight of the vehicles. Latching devices are employed for holding the beds releasably in their use positions. A turntable is mounted on the vehicle frame forwardly of the beds to enable the turntable to rotate about a centrally-disposed vertical axis independently of the beds. A platform on the turntable supports at least one more of the vehicles to enable it to be driven from the turntable platform onto one of the tiltable beds. Latching and detent devices are provided for holding the turntable in a given position. Thus, by providing separate and independent tiltable beds, one vehicle at a time can be driven up onto the beds which work independently of one another so as to avoid the problem of having one of the vehicles sliding backwardly out of position on the tilted bed while the other vehicle is attempting to be positioned on the same bed. Moreover, by providing the separate turntable disposed forwardly of the tiltable beds, additional vehicles can be carried by the same trailer, and the turntable can be rotated by 180° to enable the vehicles to be driven off of the turntable and onto the ground via either one or both of the tiltable beds.

Other objects, features and advantages of the present invention will become apparent to those skilled in the art from a study of the written description and the accompanying drawings, wherein:

FIG. 1 is a side elevational view of a trailer, which is constructed in accordance with the present invention and which illustrates the trailer supporting three snowmobiles, the trailer being in position to load a fourth vehicle thereon;

FIG. 2 is a plan view of the trailer of FIG. 1;

FIG. 3 is cross-sectional view of one of the latches for the trailer beds of FIG. 2 taken substantially along the line 3—3 thereof; and FIG. 4 is a cross-sectional view of a latch and detent device for the turntable of FIG. 2 taken substantially along the line 4—4 thereof.

Referring now to the drawings, and more particularly to FIGS. 1 and 2 thereof, there is shown a trailer 10, which is constructed in accordance with the present invention, and which is shown supporting three snowmobiles 12, 14 and 16. The trailer 10 is adapted to carry four separate snowmobiles or other vehicles simultaneously, the trailer being illustrated in the drawings in a position for loading a fourth snowmobile (not shown). It is to be understood that the trailer 10 may be used for carrying other types and kinds of vehicles as well as snowmobiles.

The trailer 10 generally comprises a frame 18 having an undercarriage 19 including a plurality of wheels 20 for rollably supporting the trailer 10 above the ground. A tongue 22 having a hitch 24 at the front distal end portion thereof extends forwardly from the frame 18 so that the trailer 10 can be connected releasably in a conventional manner to a larger vehicle (not shown), such as an automobile or a truck for pulling the trailer 10. A pair of vehicle carrying tiltable rear beds 26 and 28 are disposed at the rear end portion of the frame 18, and they are disposed substantially in a common plane in their use position. In the positions shown in the drawings, the bed 26 is disposed in its horizontal use position to support the trailer 12, and the bed 28 is illustrated in its loading and unloading position with its rear edge bearing against the ground and extending in an inclinded manner to enable the fourth vehicle to be driven up onto it. A rotating platform 31 is mounted on top of a turntable 33 for supporting a pair of snowmobiles, such as the snowmobiles 14 and 16 in a position forwardly of the tiltable rear vehicle beds 26 and 28. The vehicles 14 and 16 are loaded and unloaded onto and off of the rotating platform 31 via the respective tiltable rear beds 26 and 28, and during the discharging of the vehicles from the rotating platform 31, it is rotated about its vertical axis through 180° to enable the snowmobiles 14 and 16 to be driven off of the trailer 10 from the rotating platform 31 via the tiltable rear beds 26 and 28 onto the ground. The tiltable rear beds 26 and 28 are each pivotally mounted on the frame 18, such as the bed 28 being pivotally attached to the frame 18 at 35, forwardly of the mid-point of the beds to enable them to tilt individually and independently backwardly until their rear edges contact the ground. As a result, when the snowmobiles are loaded onto the inclinded beds, the weight of the snowmobiles causes the beds to tilt back to their horizontal use position, since the majority of the weight of the snowmobiles is at their forward end portion, which weight is disposed forwardly of the pivotal connection between the trailer bed and the trailer frame.

A pair of latches 37 and 39 connect releasably the outer edges of the respective beds 26 and 28 to the frame 18 to maintain the beds 26 and 28 in their horizontal use position. A pair of latch and detent devices 41 and 43 are disposed on diametrically-opposed portions of the turntable 33 to hold releasably the rotating platform 31 to the frame 18 to prevent the platform 31 from rotating during movement of the trailer 10 as hereinafter described in greater detail.

Considering now the frame 18 in greater detail with reference to the drawings, the frame 18 includes a pair of parallel spaced-apart longitudinally extending channels 45 and 47 which are connected at their rear ends to a cross member 48 and which are connected at their front ends to the tongue 22. The tongue 22 is in the form of a Y-shaped member 49 having the hitch 24 connected at its forwardmost end portion. A lower platform 52 is fixed by any suitable means (not shown) on top of the channels 45 and 47.

The pivotal connections, such as the pivotal connection 35, for the trailer beds 26 and 28 are in the form of bracket hinges, such as the bracket hinge 54 (FIG. 1) which are attached to the underside of the trailer beds and are pivotally attached to the frame 18.

Considering now in greater detail the turntable 33 with reference to FIGS. 1, 2 and 4 of the drawings, the turntable 33 supports from below the rotating platform 31 which rotates about a vertical pivot post 56 at the center therof. The rotating plantform 31 is four-sided in shape and is in the preferred embodiment of the present invention, square in shape.

The turntable 33 includes a series of ball bearings 58 which are disposed between an upper race 60 fixed to the underside of the rotating platform 31 and a lower race 62 supported on the lower platform 52.

Considering now the latches for the trailer beds 26 and 28, the latch 39 will now be considered in greater detail, it being understood that the latch 37 is similar in construction to the latch 39. As best seen in FIG. 3 of the drawings, the latch 39 includes a bracket 64 which is fixed to the underside of the lower platform 52 at the side edge thereof and includes a depending leg portion 65 to which is attached a lever 66 pivotally connected thereto at 67. The lever 66 includes a hook portion 68 for engaging the upper surface of the tiltable bed 26 to hold it down in position during movement of the trailer 10. The lever 66 also includes a lower portion 70 disposed below the pivot point 67 opposite the hook portion 68, and a compression spring 72 connected between the distal end portion of the lower portion 70 and the leg 65 resiliently urges the hook portion 68 into engagement with the upper surface of the trailer bed 26 as shown in FIG. 3 of the drawings. The lower portion 73 of the outer edge of the bed 26 is beveled to mate with a flattened surface 68A of the hook portion 68 to cam it out of the path of travel of the bed 26 as it moves into a horizontal position. As a result, the lever moves in a clockwise direction as viewed in FIG. 3 of the drawings to permit the bed 26 to move into engagement with the platform 52. When the lever 66 moves in a clockwise direction, the spring 72 compresses so that when the bed 26 rests upon the platform 52 the spring 72 serves to pivot the lever 66 in a counter-clockwise direction as viewed in FIG. 3 of the drawings to return the hook portion 68 to its normal vertical position in engagement with the upper surface of the bed 26.

When the bed 26 is tilted backwardly to a position as viewed in FIG. 1 of the drawings, the bed 26 forces the hook portion 68 to move out of engagement with the upper surface of the bed 26 and to move the lever 66 in a clockwise direction. Thus, the latch 39 operates automatically when the bed 26 moves into or out of the horizontal use position. In this regard, when the bed 26 is tilted backwardly to its inclined position, the latch 66 automatically releases as hereinabove described. Such movement can be accomplished by either the user pulling down on the rear end portion of the bed 26 when the bed is unloaded, or when the bed 26 is loaded with a snowmobile or other such vehicle, the snowmobile can be pushed rearwardly by a sufficient amount to position its center of gravity rearwardly of the pivotal connection between the bed and the frame. By positioning the center of gravity to the rear of the pivotal connection, the bed 26 pivots about its pivotal connection to the frame 18 in a counter-clockwise direction as viewed in FIG. 1 of the drawings until it assumes its inclined position with its rear edge contacting the ground. When the bed is unloaded and disposed in its inclined position, a vehicle, such as the snowmobile 12, can be driven up onto the inclined bed until the center of gravity of the snowmobile 12 is disposed forwardly of the pivotal connection with the frame 18. At such a position, the bed 26 pivots in a clockwise direction about its pivotal connection until the front portion of the bed 26 engages the lower platform 52. In so doing, the bed 26 moves into position for enabling the hook portion 68 to engage the upper surface of the bed 26 for latching purposes.

It should be noted that the rear portions of the beds 26 and 28 extending rearwardly from their pivotal connection with the frame 18 are cantilevered from the frame 18 when the beds 26 and 28 are disposed in their horizontal use position.

Considering now the latch and detent devices with reference to FIG. 4 of the drawings, the device 41 will now be described in greater detail, it being understood that the device 43 being similar to the device 41 in construction. The device 41 includes a laterally extending tongue 74 fixed to the upper race 60 of the turntable 33 below the rotating platform 31 so that the tongue 74 is adapted to rotate with the rotating table 31. It should be understood that the device 43 includes a similar tongue 75 fixed to the upper race 60 under the rotating platform 31 disposed 180° away from the tongue 74. The tongue 74 has a pointed distal end portion 76 which fits into a recess 78 in the upper portion of a lever 81 pivotally attached at 83 to a bracket 85, which in turn is fixed to the underside of the lower platform 52 of the frame 18. An outwardly laterally extending weighted portion 87 of the lever 81 extends below the pivot point 83 so that the user can grasp the rotating platform 31 and rotate it about its axis 56 and the pointed end portion 76 of the tongue 74 moves out of engagement with the recess 78, the weighted end portion 87 facilitating the counter-clockwise rotation of the lever 81 about its pivot point 83 as viewed in FIG. 4 of the drawings. A spring 89 resiliently urges the lever 81 into a position where the recess 78 is in position to receive the pointed end portion 76 of the tongue 74. As a result, once the tongue moves out of engagement with the recess 78, the spring 89 causes the lever 81 to snap back to its original position, thereby causing the lever 81 to pivot about its pivot point 83 in a clockwise direction as viewed in FIG. 4 of the drawings. As a result, the lever 81 is then in a position where its recess 78 can receive the other tongue once the rotating platform 31 has been moved through 180°. Hence, the device 41 and the device 43 serve not only as latches but also as detents to stop the further rotation of the platform 31 after it has moved through 180°. The spring loaded device therefore operates automatically in a similar manner as the latching device 39.

In order to facilitate this automatic operation, the pointed end portion 76 of the tongue 74 has a pair of angularly disposed faces 76A and 76B which mate with a pair of angularly disposed faces 81B and 81A respectively of the lever 81 to cam the lever 81 out of the path of travel of th tongue 74 as it moves into position to be received by the recess 78. For example, should the rotating platform 31 be rotating in a counter-clockwise direction as viewed in FIG. 2 of the drawings to bring the tongue 74 into a position as shown therein, the angular face 76A of the tongue 74 first engages the right hand angular face 81B of the lever 81 to cause the lever 81 to pivot backwardly out of the path of travel of the tongue 74 (in a counter-clockwise direction about the pivot point 83 as viewed in FIG. 4 of the drawings). Thus, the tongue 74 is then able to enter the recess 78 when the lever 81 snaps back to its position as shown in FIG. 4 of the drawings when the pointed end portion 76 of the tongue 74 is directly opposite the lever 81 to permit it to return by means of its spring 89 to its tongue receiving position as shown in FIG. 4 of the drawings.

It wil be readily apparent to those skilled in the art that the present invention provides a novel and useful improvement in multiple position vehicle carrying trailers of the character described herein. The arrangement and types of structural components utilized within the invention may be subject to numerous modifications well within the purview of this invention and it is intended only to be limited to a liberal interpretation of the specification and appended claims.

What is claimed is:

1. A trailer adapted to carry a plurality of vehicles, comprising:
   a frame means;
   a plurality of wheels rotatably mounted on said frame means to support it rollably above the ground;
   a pair of vehicle supporting trailer beds normally disposed in a use position in side-by-side relationship in a common horizontal plane on said frame means for each supporting individually from below one of said vehicles;
   pivoting means disposed at the rear edge of said frame means for mounting individually and tiltably said beds on said frame means forwardly of the mid-point of said beds to enable them to tilt individually and independently backwardly until their rear edges contact the ground and to enable the loaded beds to tilt back to their horizontal use position under the weight of the vehicles;
   latching means for holding said beds releasably in their use positions;
   a turntable:
   means for mounting said turntable on said frame means forwardly of said beds to enable said turntable to rotate about a centrally-disposed vertical axis independently of said beds;
   means on said turntable supporting at least another one of said vehicles to enable it to be driven from said turntable onto one of said beds; and
   latching and detent means for holding said turntable in a given position.

2. A trailer according to claim 1, wherein said frame means includes a lower platform underlying said beds and said turntable.

3. A trailer according to claim 2, wherein said frame means further includes a pair of parallel spaced-apart longitudinally-extending channels underlying said lower platform.

4. A trailer according to claim 3, wherein said means on said turntable includes a turntable platform overlying and mounted fixedly on said turntable, the plane of said turntable platform being disposed slightly above the plane of said beds.

5. A trailer according to claim 4, wherein said pivoting means includes bracket hinges.

6. A trailer according to claim 1, further including a turntable, means for mounting said turntable on said frame means forwardly of said beds to enable said turntable to rotate about a centrally-disposed vertical axis independently of said beds, means on said turntable supporting at least another one of said vehicles to enable it to be driven from said turntable onto one of said beds, latching and detent means for holding said turntable in a given position.

7. A trailer according to claim 1, wherein said latching and detent means includes a pair of tongues mounted on opposite sides of said turntable, a pair of lever means having recesses therein movably mounted on opposite sides of said frame means for engaging said tongues.

8. A trailer according to claim 7, wherein each of said lever means includes a pivotally mounted lever having biasing means at one end of said lever for urging said recess to receive one of said tongues when said turntable is rotated to a position opposite the last-mentioned recess.

* * * * *